Figure 1:
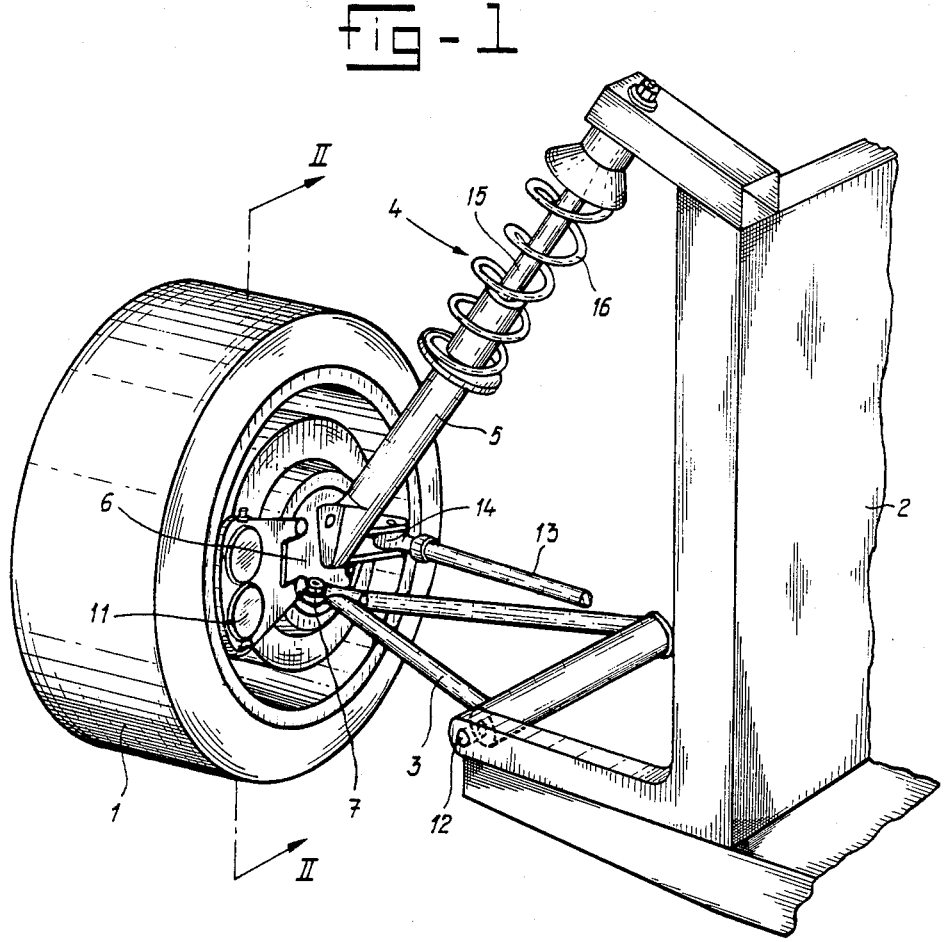

United States Patent [19]

Huidekoper

[11] Patent Number: 4,763,920

[45] Date of Patent: Aug. 16, 1988

[54] SUSPENSION FOR A WHEEL

[76] Inventor: Louis Huidekoper, Paviljoensgracht 90, 2512 Br The Hague, Netherlands

[21] Appl. No.: 71,027

[22] Filed: Jul. 8, 1987

[30] Foreign Application Priority Data

Jul. 10, 1986 [NL] Netherlands ............. 8601815

[51] Int. Cl.$^4$ .................................... B60G 3/02
[52] U.S. Cl. ................... 280/668; 301/108 R; 280/696
[58] Field of Search ............ 280/668, 667, 96.1, 280/666, 670, 696, 701, 724; 301/108 R, 108 SC

[56] References Cited

U.S. PATENT DOCUMENTS

| | | | |
|---|---|---|---|
| 2,782,871 | 2/1957 | Schjolin | 301/108 R |
| 3,075,787 | 1/1963 | Mineck | 280/667 |
| 3,469,859 | 9/1969 | Giacosa | 280/668 |
| 4,526,249 | 7/1985 | Parker | 180/219 |

FOREIGN PATENT DOCUMENTS 0122161 10/1984 European Pat. Off. ..
7901467 8/1979 Netherlands .

Primary Examiner—Kenneth R. Rice
Attorney, Agent, or Firm—Bachman & LaPointe

[57] ABSTRACT

A suspension for a steerable wheel includes a support plate to which wheel bearing means are connected. The support construction for connecting to the frame or chassis is also connected to this support plate. This support construction includes an upper single support member rigidly connected to the support plate and a lower support member, being connected through a pivot joint with the support plate, wherein the distance from the center of that pivot joint to the axis of the wheel bearing means is smaller than the distance from the inner wheel bearing ring to the axis. Both upper and lower support members are provided laterally from the wheel in the direction of movement.

7 Claims, 4 Drawing Sheets

SUSPENSION FOR A WHEEL

This invention relates to suspension for a wheel, comprising a support plate, to which wheelbearing means are connected on the one hand, and a support construction for connection to the frame or chassis on the other hand, said support construction comprising an upper single support member rigidly connected to the support plate and at least in the sense of steering rotatably connected to the frame/chassis, and a lower support member, being connected through a pivot joint with said support plate, the distance from the center of the pivot joint to the axis of the bearing means being smaller than the distance from the inner wheelbearing ring to said axis.

Such a suspension is known from EP-A-0122161. The structure known from this publication is only suitable for vehicles having two wheels behind each other in the direction of movement and has as further drawback that a considerable number of linkages is used for connecting the wheel to the frame/chassis.

Subject invention aims to obviate these drawbacks and to provide a wheel suspension which can be used in vehicles having more than two wheels, or having two wheels not being behind each other in the direction of movement.

According to the invention this aim is realised in that the lower support member extends substantially in the direction of the wheel axis and is connected to the frame/chassis at the side of the wheel, and in that the upper support member is connected to the frame at the side of the wheel.

By arranging both lower support member and upper support member lateral from the wheel and connecting these to the frame/chassis a suspension is obtained suitable for above mentioned vehicles. With this structure a relatively low number of components is sufficient for linking the wheel to the frame/chassis.

According to a preferred embodiment the lower support member comprises a triangle structure. In a very simple way it is now possible to obtain a light and yet rigid linkage between the wheel and the chassis.

Because one side of the wheel is now totally free from support arms, it is now possible to use this side to arrange a cap which covers the wheel. Because of the large diameter inner ring of the wheelbearing means a very secured mounting of said cap can be obtained. This cap is advantageous with regard to safety and will also lower the drag coefficient of the vehicle provided with such a suspension.

To connect the upper support member to the chassis two possibilities are preferred. First of all a further support member can be coupled between the frame/chassis and the upper support member. If this further support member is embodied as a triangle a double triangle construction can be obtained. However it is also possible to embody the upper support member as "Mc Pherson" strut, which is as such well known in the art. Both structures are very simple to realize and their use will depend from design and cost considerations. According to a further preferred embodiment said wheel is a steerable wheel.

Figure 2:
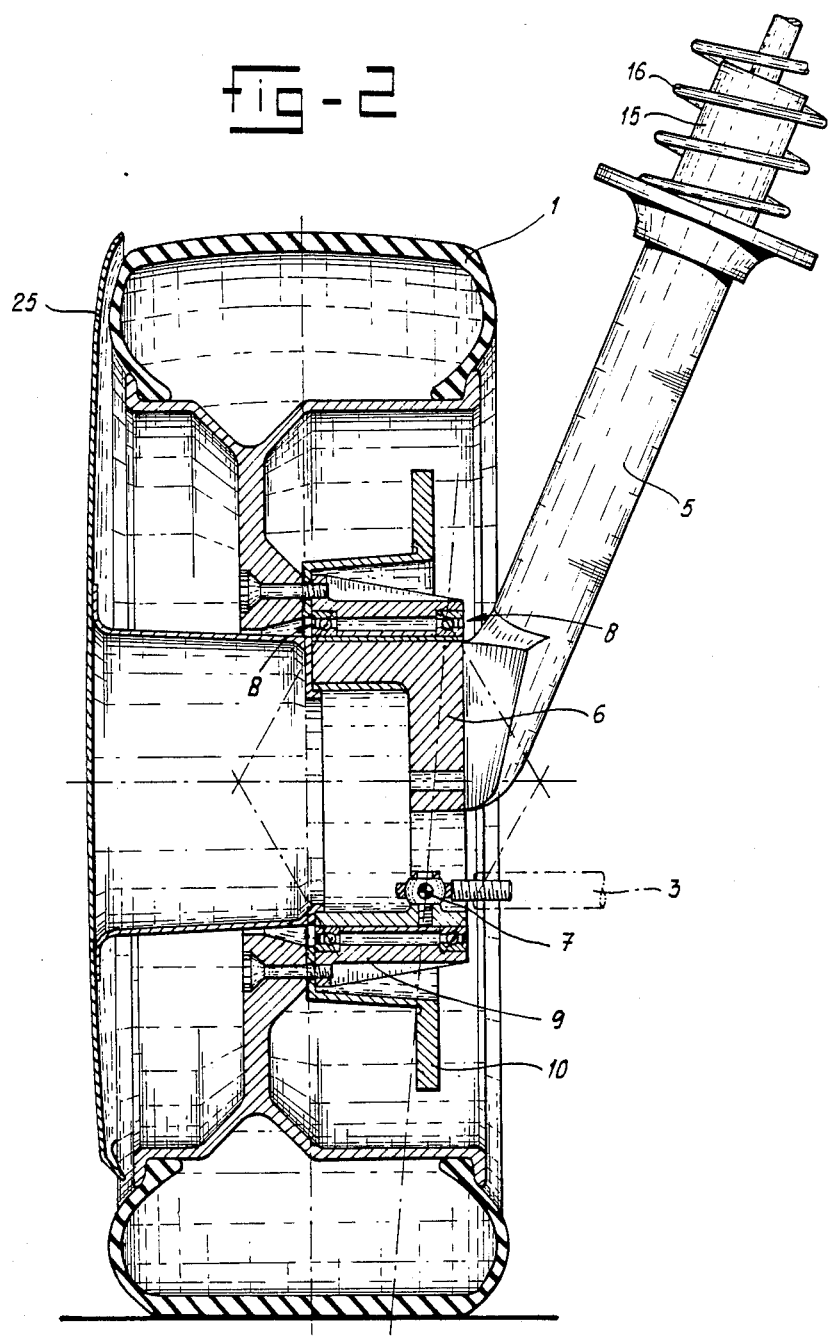
Figure 3:
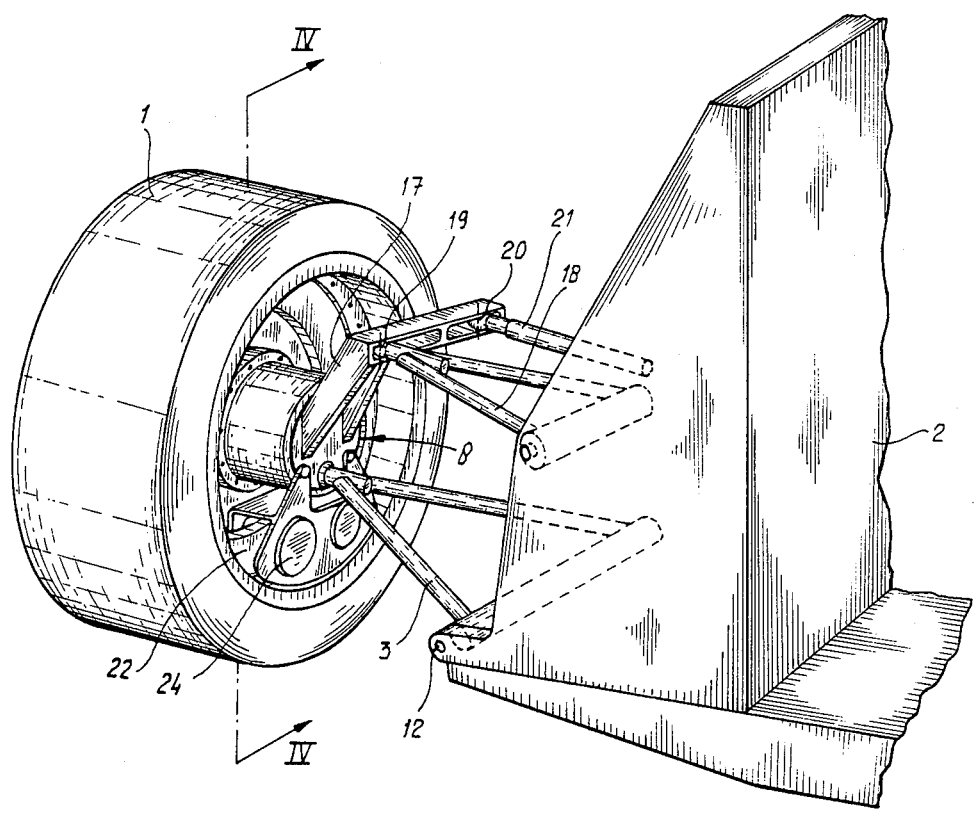
Figure 4:
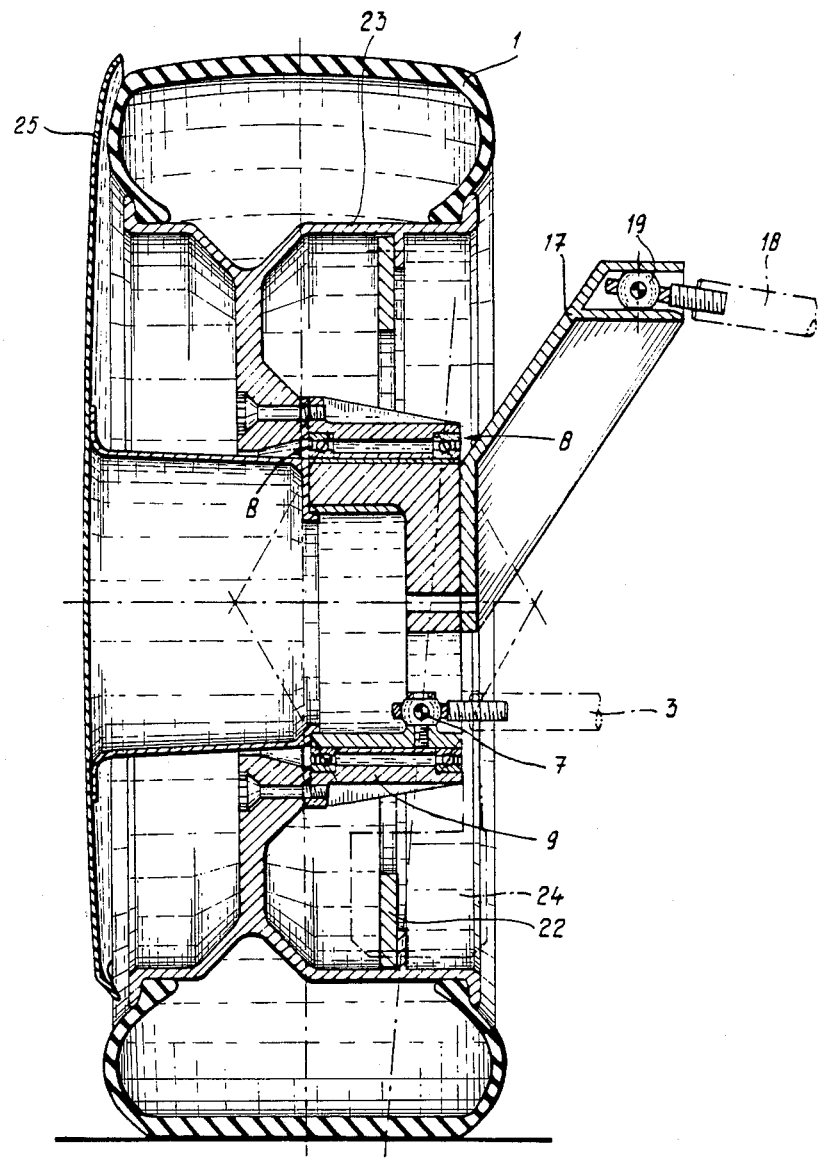

The invention will be elucidated hereafter in more detail referring to the enclosed drawing, in which:

FIG. 1 shows a side elevation of a wheel suspension according to the invention with "Mc Pherson" strut, FIG. 2 is a cross section according to II—II in FIG. 1, FIG. 3 a side elevation of an embodiment according to the invention in which a further suspension member is used, and FIG. 4 a cross section according to IV—IV in FIG. 3.

FIG. 1 shows a wheel suspension system with wheel 1 for a vehicle, such as for example for a three-wheeled vehicle. Wheel 1 is attached to frame or chassis 2 by means of a support structure comprising a lower support member 3 and a "Mc Pherson" strut generally indicated at 4. Lower support member 3 extends substantially in the direction of the wheel axis. This has to be understood in contrast with support members extending substantially perpendicular to the wheel axis. So it is possible that support member 3 is arranged with a small angle relative to this wheel axis. Because wheel 1 can be rotated in the sense of steering the "wheel axis" comprises series of axii defining a plane. End 5 of "Mc Pherson" strut 4 is rigidly connected to support plate 6. Lower support member 3 is connected with support plate 6 through pivot joint 7. From FIG. 2 the connection of support plate 6 to wheelbearing means 8 is clear. The inner ring of wheelbearing means 8 engages support plate 6 while the outer ring of wheelbearing means 8 engages hub 9. To hub 9 disk 10 of a brake disk assembly is connected. Calliper 11 which can engage disk 10 is connected to support plate 6. For further details of wheelbearing means 8 and the location of pivot joint 7 reference is made to copending U.S. patent application Ser. No. 006,724, which relates to a wheel suspension system where two pivot joints are used above each other and which are located within the internal bore of the wheelbearing means. Lower suspension member 3 is hinged at 12 to frame 2. For controlling the steering motion of wheel 1 a steering link 13 is provided being hingedly connected with support plate 6 through pivot joint 14 on the one hand and is connected to a steering mechanism (not shown) on the other hand. At its upper end "Mc Pherson" strut 4 comprises a piston rod 15, on the one hand connected to frame/chassis 2 and with its other end sliding in the lower end 5 of "Mc Pherson" strut 4. Also spring 16 is shown engaging between frame/chassis 2 and lower end 5 of "Mc Pherson" strut 4.

From FIG. 2 it is also clear tha a non rotating wheel cap 25 is used, extending over a substantial part of the outer circumference of the wheel. Because large diameter wheelbearing means 8 are used it is possible to have said cap engage support plate 6 over a considerable cross section area, which improves the stability of mounting of cap 25. Because of the presence of cap 25 improved security is obtained as well as a lower drag coefficient of the vehicle in which this cap is used. A further embodiment of the suspension system according to the invention is shown in FIGS. 3 and 4. In this embodiment the "Mc Pherson" strut is replaced by a conventional upper support arm 17 being linked to frame/chassis 2 through a further support arm 18. Further support arm 18 is hinged connected to chassis 2. Connection between upper support arm 17 and further support arm 18 is provided through a pivot joint 19. On upper support arm 17 a further pivot joint 20 is provided connecting steering linkage 21 with support plate 6. The structure of lower support member 3 is substantially the same as shown in the embodiment according to FIGS. 1 and 2. However, as is particularly clear from FIG. 4 the disk-calliper arrangement is embodied differently. From FIG. 4 it is clear that disk 22 is directly connected to wheel rim 23. Brake calliper 24 is connected to support plate 6. Also a disc and brake calliper system as shown in the aforesaid copending application Ser. No. 066,724 is possible.

Although the above described embodiments are presently preferred, it has to be understood that many modifications can be realised by anyone skilled in the art being within the scope of protection of subject invention. More particular it is possible to combine several features of the differene embodiments described above or to introduce modifications being generally known in the art of suspensioning of wheels. For instance it is possible to replace "Mc Pherson" strut 4 by other arrangements through which it is possible to connect upper support member rotatingly telescopingly with the frame/chassis. Support plate 6 can have any shape suitable to adapt bearing means 8 and to receive several support members. Support plate 6 can also be integrally formed with lower end 5 of strur 4. Although in the figures a steerable wheel is shown, it has to be understood, the above suspension can also be used with wheels not being steerable, such as on rear axles on vehicles.

I claim:

1. Suspension for a steering wheel which comprises: a frame or chassis; a support construction connected to said frame or chassis; a support plate connected to said support construction; wheelbearing means connected to said support plate, said wheelbearing means having an inner ring and an axis; wherein said support construction comprises an upper single support member rigidly connected to the support plate and pivotly connected to the frame or chassis at the side of the wheel, and a lower support member connected to said support plate through a pivot joint, extending substantially in the direction of the wheel axis and connected to the frame or chassis at the side of the wheel; and wherein the distance from the center of the pivot joint to the axis of the wheelbearing means is smaller than the distance from the inner wheelbearing ring to the axis of the wheelbearing means.

2. Suspension according to claim 1 wherein the lower support member comprises a triangle structure.

3. Suspension according to claim 1, wherein at the side of the wheel opposite to the side where the support members are provided, a non-rotating cap is connected to the internal wheel bearing means, covering the wheel.

4. Suspension according to claim 1, wherein the upper support member is connected to a further support member through a pivot joint, said further support member being hingedly connected to said frame or chassis and extending substantially in the direction of the wheel axis.

5. Suspension according to claim 1 wherein the upper support member is rotatably connected with a member connected to the frame or chassis.

6. Suspension member according to claim 1 wherein the upper support member is telescopingly connected with a member connected to the frame or chassis.

7. Suspension according to claim 1 wherein the wheel is a steerable wheel.

* * * * *